United States Patent [19]

Korytko

[11] Patent Number: 4,515,551

[45] Date of Patent: May 7, 1985

[54] CLOSED LOOP HYDRAULIC/MECHANICAL LEVELING SYSTEM

[75] Inventor: Myron I. Korytko, Erie, Pa.

[73] Assignee: EFCO, Inc., Erie, Pa.

[21] Appl. No.: 629,608

[22] Filed: Jul. 11, 1984

[51] Int. Cl.[3] .......................... B30B 15/16; B29C 3/00

[52] U.S. Cl. ...................................... 425/406; 425/214

[58] Field of Search ................. 425/149, 406, 25, 150, 425/214

[56] References Cited

U.S. PATENT DOCUMENTS

| | | | |
|---|---|---|---|
| 3,154,814 | 11/1964 | Fike | 425/25 |
| 3,570,060 | 3/1971 | Stephenson | 425/214 |
| 3,850,564 | 11/1974 | Hutter | 425/406 X |
| 4,053,276 | 10/1977 | Ahriveiler et al. | 425/406 |
| 4,240,778 | 12/1980 | Korytko | 425/149 |

*Primary Examiner*—J. Howard Flint, Jr.

*Attorney, Agent, or Firm*—Baldwin, Egan, Walling & Fetzer

[57] ABSTRACT

A fluid powered press comprising a first platen and a second platen with at least one of the platens being reciprocably movable along a predetermined axis relative to the other platen and having motor means for so moving the movable platen, and a leveling system therefor. The leveling system comprises a plurality of hydraulic leveling piston and cylinder units mounted on one of the platens with each of the leveling units including a projecting rod member connected to the piston of the respective leveling unit and movable with the piston axially relative to the cylinder of the respective leveling unit. Reciprocal fluid powered motor units mounted on the other platen coact with wedge locks for selectively coupling the rod members to the other platen. Means are provided for maintaining the leveling unit cylinders filled with hydraulic fluid; and conduit means communicate pairs of the leveling units together in a closed loop system, with such leveling units when coupled to the other platen resisting tilting movement of the platens relative to one another during operation of the press.

17 Claims, 3 Drawing Figures

CLOSED LOOP HYDRAULIC/MECHANICAL LEVELING SYSTEM

This invention relates in general to fluid powered presses or the like, in which a plurality of members such as platens are relatively movable towards one another to develop relatively high pressures therebetween, and more particularly provides a press and associated closed loop hydraulic/mechanical leveling system, for resisting tilting movement of the platens relative to one another and thus maintaining parallelism between the platens.

BACKGROUND OF THE INVENTION

Various mechanism or systems are known in the art for attempting to prohibit tilting of press platens relative to one another, and thus maintain parallelism between the relatively movable platens in a compression press, during closing movement of the platens. As is well known, eccentric loading in such type presses is frequently encountered.

In U.S. Pat. No. 4,240,778 dated Dec. 23, 1980 in the name of Myron I. Korytko and entitled "System for Providing Parallelism in Fluid Powered Press or the Like", there is disclosed a leveling system which utilizes a hydraulic closed loop system for resisting tilting movement of the press platens. Such hydraulic closed loop system or servo type control reduces the energy or force available to the press in order to accomplish its work function. In certain situations, if an off-center load condition is too great, the leveling system may actually prevent the press from having an adequate capability of making the desired product thereon.

SUMMARY OF THE INVENTION

The present invention provides a press and associated hydraulic leveling system for resisting tilting movement between the press platens and thus maintaining the latter parallel, and wherein the hydraulic leveling system utilizes a closed-loop hydraulic/mechanical system which does not reduce or deduct any energy or force from the press or equipment with which it is utilized, regardless of the magnitude and the location of the off-center loads.

The leveling system of the invention includes a plurality of hydraulic leveling piston and cylinder units, with each leveling unit including a projecting rod member connected to the piston of the respective leveling unit, and movable with the piston axially, relative to the cylinder of the respective leveling unit, with such leveling units being mounted on one of the platens, together with means providing for selectively coupling the rod members to the other of the press platens, and conduit means provide hydraulic fluid communication between diagonally or oppositely disposed leveling units, for resisting tilting movement of the platens relative to one another.

Accordingly, an object of the invention is to provide a novel compression press or the like embodying means for maintaining the press platens generally parallel by resisting tilting movement between the platens.

A still further object of the invention is to provide mechanism of the above type in which a hydraulic leveling system is provided for maintaining parallelism between the relatively movable force applying members of the press or the like, and a leveling system that will not result in a reduction of any energy force from the press hydraulic or mechanical system, irrespective of the magnitude and location of the off-center load.

A still further object of the invention is to provide a press of the above mentioned type wherein the leveling system comprises a plurality of hydraulic leveling piston and cylinder units each of which includes a projecting rod member connected to the piston of the respective leveling unit, and movable with the piston axially relative to the cylinder of the respective leveling unit, with the leveling units being mounted one of the platens, together with means for selectively coupling the rod members to the other of the platens, and wherein there is provided hydraulic fluid conduit means communicating between the leveling units.

A still further object of the invention is to provide a hydraulic leveling system which is adapted for installation in a mechanism, such as a compression press having relatively movable platen members, and in the event that eccentric loading conditions are encountered, the leveling system provides for maintaining the relatively movable platen members generally parallel with respect to one another during axial movement between the relatively movable members, and without reducing or deducting any energy force from the main actuating force applying system of the mechanism.

Other objects and advantages of the invention will be apparent from the following description taken in conjunction with the accompanying drawings wherein:

DESCRIPTION OF PREFERRED EMBODIMENT

Figure 1:
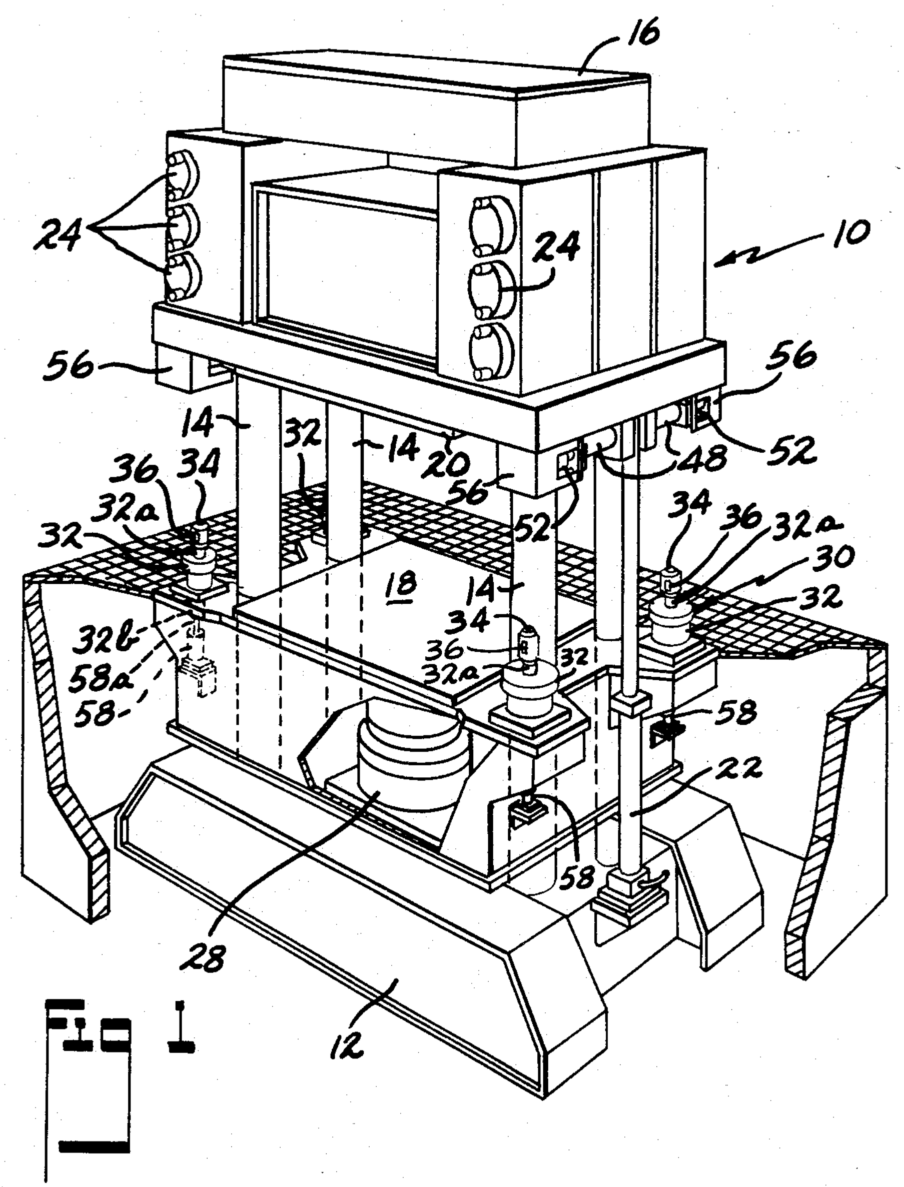
FIG. 1 is a partially broken, generally diagrammatic illustration of a compression press embodying the hydraulic leveling system of the invention.

Referring now particularly to FIG. 1 of the drawings, there is illustrated the invention as applied to a compression molding press 10. Such press, in the embodiment illustrated, comprises a base 12 having four upstanding tie rods 14 connected at the top thereof by means of crosshead 16. The press, in the embodiment illustrated, includes a lower or base platen 18 and an upper platen 20 movable axially relative to one another, and are guided in such movement by tie rods 14. Fluid powered motor units 22 coact between the base 12 and the upper platen structure 20 for moving the upper platen relative to the lower platen 18.

In the embodiment illustrated, the upper platen structure 20 includes clamp cylinder mechanism 24 of known arrangement, for clamping the upper platen to the tie rod structure at a desired vertical position of the upper platen with respect to the lower platen. In the embodiment illustrated, the upper platen 20 may descend by gravity to a selected position, whereupon the clamp structure 24 locks the upper platen in the selected position. Motor units 22 are utilized for returning the upper platen to an upper position, for instance the one illustrated in FIG. 1, upon deactuation of the clamping mechanism 24. The lower platen 18 may be moved upwardly relative to the tie rods 14 from the position illustrated in FIG. 1, by means of the main fluid powered ram cylinder 28, and in a known manner.

Normally, the upper platen is adapted to move parallel relative to the lower platen, but when off-center loads are applied to the workpiece being formed or handled between the platens, the platens may be caused to tilt relative to one another out of parallelism. This non-parallel or "tilted" relationship between the platens may affect the finished product as well as causing excessive wear in the dies utilized with the press or in the press structure itself.

The present invention provides a leveling system 30 (FIGS. 2 and 3) which may be expeditiously embodied in a press or other like mechanism, for resisting tilting movement between the platens of the mechanism, and thus maintain parallelism between the relatively movable platen members. Such leveling system in the embodiment illustrated, comprises a plurality of hydraulic leveling piston and cylinder units 32 (in the arrangement illustrated four equal size units) each of which includes a projecting rod member *32a*, *32b* connected to the piston *32c* (FIG. 3) of the respective leveling unit and movable with the piston axially relative to the cylinder *32d* of the respective leveling unit. In the embodiment illustrated, the rod members *32a*, *32b* extend from both ends of the cylinder *32d* with the upper projecting rod member *32a* including a head portion 34. The head portion 34 is apertured as at 36, for a purpose to be hereinafter described.

Figure 2:
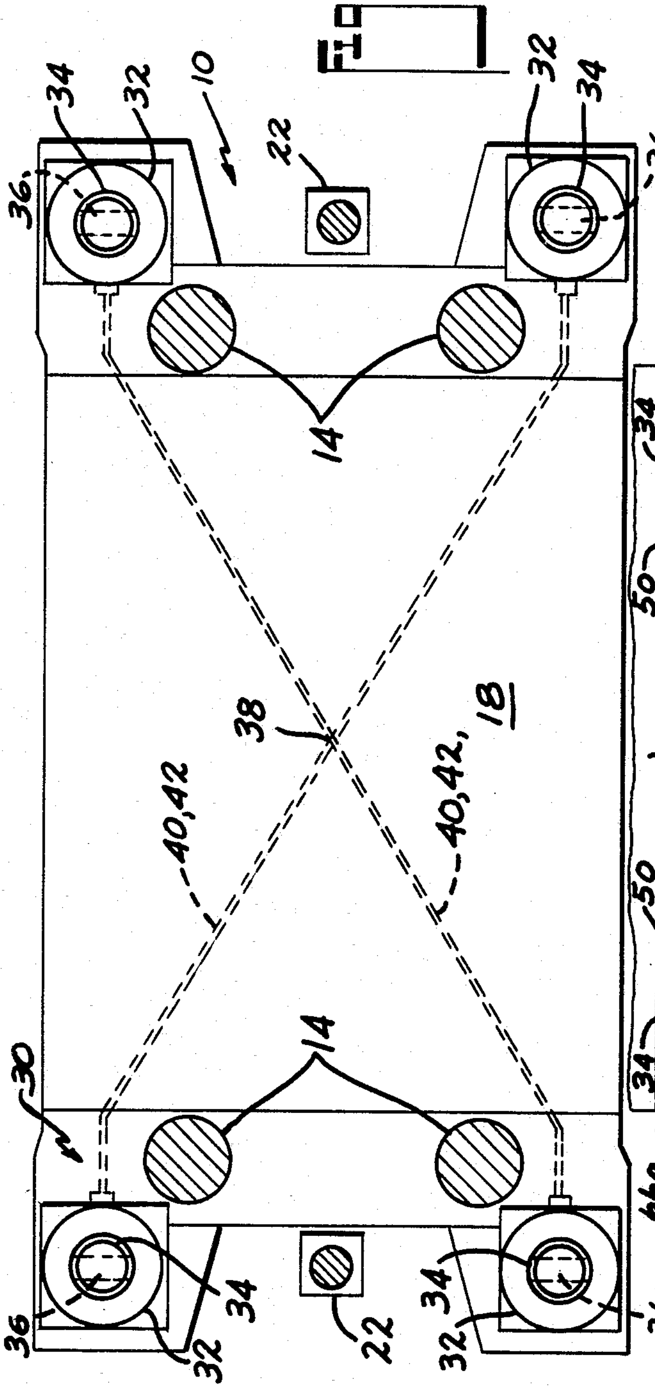
FIG. 2 is an enlarged generally diagrammatic, horizontal sectional view taken through the press of FIG. 1 and illustrating conduit means communicating diagonally opposed leveling units of the system with one another, such closed loop leveling system adapted to resist tilting movement of the press platens.
Figure 3:
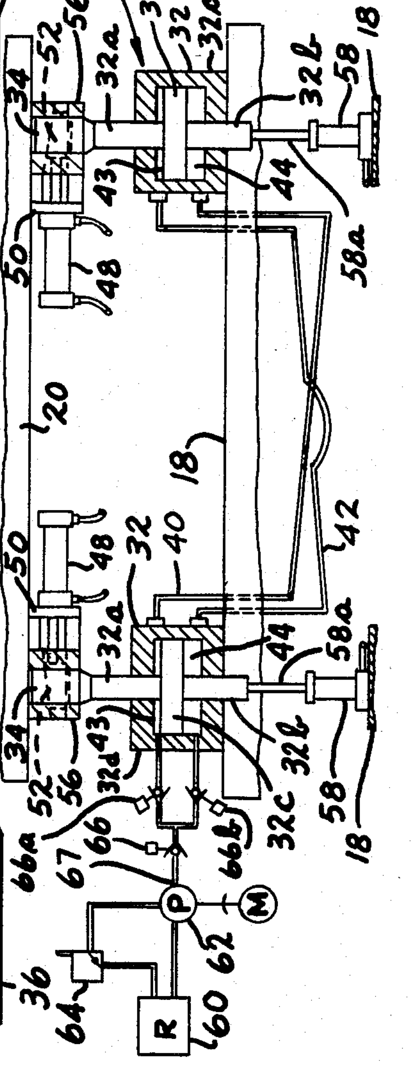
FIG. 3 is an enlarged, diagrammatic partially sectioned illustration of two leveling units of the leveling system of the invention communicating with one another via hydraulic conduit lines, and with the projecting rod members of the leveling units being coupled to the upper platen of a press by means of selectively actuatable coupling means.

In the arrangement illustrated, the leveling units 32 are mounted on and secured by any suitable means to the lower platen 18, preferably generally adjacent the four corners thereof and generally equal distances from the vertical axial center 38 (FIG. 2) of the lower platen. Conduit means 40, 42 extend between diagonally opposed leveling units of each pair as best illustrated in FIGS. 2 and 3, for providing for hydraulic fluid communication between such diagonally opposed leveling units. As can be best seen in FIG. 3, the conduit 40 couples the upper chamber 43 of one of the leveling units 32 with the lower chamber 44 of the diagonally opposed leveling unit, while conduit 42 couples the upper chamber 43 of such diagonally opposed coupling unit with the lower cylinder chamber 44 of the first mentioned leveling unit, to provide a closed hydraulic loop system.

Means are provided for coupling the head portions 34 of the rod members *32a* of each leveling unit to the upper platen 20. Such means, in the embodiment illustrated, includes fluid powered double acting reciprocal motor units 48 mounted in the embodiment illustrated on a respective bracket structure 50 supported by the upper platen structure 20, and with each motor unit 48 having secured to the projecting piston rod thereof a preferably cam wedge lock member 52 adapted to be received in the aforementioned, preferably complementary tapered opening 36 in the respective head portion 32 of the corresponding leveling unit, for thus locking the head portion securely to the upper platen. Retraction of the piston rod of each motor unit 48 from its extended position will withdraw the wedge lock member 52 from locking coaction with the respective head of each leveling unit permitting separation of the leveling units and the upper platen.

Each head 34 is adapted to be received in female type bracket 56 secured to the upper platen structure 20, and thus provide a convenient arrangement for locking the piston and piston rod sections of each leveling unit to the upper platen structure. While a hydraulic locking mechanism has been illustrated for coupling or locking the piston rod members of each leveling unit to the upper platen 20, it will be understood that other types of suitable locking means could be utilized for locking and unlocking the piston rod members of the leveling units to the movable platen 20.

In the embodiment illustrated, support cylinders 58 are mounted in secured relation on the lower platen structure 18, as best illustrated in FIG. 1 for providing for a reference line for the upper ends of the rod members *32a* of leveling units 32, and ensuring that the piston portions *32c* of the leveling units are in the same position or horizontal plane with respective to their respective cylinder, when the leveling system is coupled to the upper platen assembly. Such support cylinders 58 may be single acting hydraulically actuated motor units which are adapted to have the motor unit rod *58a* thereof engage with the respective rod section *32b* of each respective leveling unit 32, and thus uniformly position the piston members *32c* of each leveling unit 32 in the same relationship with respect to its coacting cylinder section *32d*.

Means are provided for maintaining the leveling unit cylinders filled with hydraulic fluid, and in this connection there is diagrammatically illustrated a hydraulic system which can provide such hydraulic fluid to the leveling unit piston and cylinder units. Such system may include a reservoir 60 of hydraulic fluid, a motor driven pump 62, a pressure relief valve 64, and also preferably includes pilot operated check valve units 66, *66a* and *66b*. Pump 62 upon actuation thereof and upon proper actuation of the pilot check valves 66, *66a* and *66b*, will ensure that the cylinders *32b* of the leveling system 30 are filled with the hydraulic fluid, and deactuation of the pilot valve members 66, *66a* and *66b* will then prevent any further flow of hydraulic fluid from the pressure port 67 of the pump into the leveling system, and preventing back flow of hydraulic fluid from the leveling units. The pump is of course connected to each pair of leveling units. Pressure relief valve 64 ensures that any excess hydraulic fluid pressure is returned to the system reservoir. The above system ensures isolation of the leveling system from the source of hydraulic fluid during operation of the press, and maintains the closed-loop status of the leveling system.

Operation of the leveling system in the press illustrated is preferably as follows:

With the support cylinders 58 pressurized, as for instance at 200 p.s.i. (this being an example only) the pistons and associated rod members *32a*, *32b* of each leveling unit 32 are located at the same axial position in their respective leveling cylinder *32d*, with the cylinders *32d* having been previously filled to capacity with hydraulic fluid from the pressurized hydraulic fluid source 60, 62, thus establishing a line or plane of reference for the upper ends of the piston rod sections *32a*.

. The lower platen 18 may then be lowered either by gravity or by actuated motor units (in the embodiment illustrated by gravity) until the head portions 34 of the piston rod section *32a* are received in a respective female locking bracket 56, as illustrated for instance in FIG. 3. Actuation of the locking motor units 48 drives the respective wedge lock member 52 attached to the piston rod of the respective motor unit 48, into the complementary wedge-shaped opening 36 through each head portion 34, to thus positively lock the piston rod section 32*a* of each leveling unit 32 to the upper platen structure 20. Clamping units 24 may then be actuated to lock platen 20 with respect to the tie rods.

It will be seen that the check valves 66, 66*a*, 66*b* in the supply lines of the pressure source of hydraulic fluid (60, 62) are closed, so that the leveling system represented by the leveling piston and cylinder units 32 and interconnecting conduit lines 40, 42, is a closed system utilizing no exterior pressure or force, but only the hydraulic fluid within the leveling cylinders and the associated conduit lines 40, 42.

Actuation of the main ram or press 28 causes upward movement of the bottom platen 18 relatively to the top platen 20 to perform the work operation on the conventional die normally disposed between the press platens. In the event of off-center forces being applied to the platens by compression of the work in the die, any tilting movement that tends to occur will be resisted by the closed loop leveling system in the invention.

If we assume for instance for purposes of discussion, that during the work forming operation on the press the forward righthand corner of platen 18 is tending to be tilted upwardly relative to the rearward lefthand corner of the platen 18, the hydraulic fluid in lower chamber 44 of the forward righthand corner leveling unit would be forced into the upper chamber 43 of the leveling unit on the rearward lefthand corner of the platen, to thus urge the platen 18 back toward horizontal or level condition, and maintain parallelism between the platens 18 and 20. A similar reaction will occur if off-center loading causes tilting of any other corners of the platens.

Upon completion of the press work operation, deactuation of the locking motor units 48 will cause release of the head portions 34 of piston rod sections 32*a* of the leveling units from their locked condition with respect to the locking brackets 56, so that the upper platen 20 can then be moved upwardly away from the lower platen and the associated workpiece, such movement being accomplished in the press embodiment illustrated, by actuation of the motor units 22 after deactuation of the clamping mechanism 24 on the upper platen.

It will be understood of course that the leveling cylinders 32*d* and associated pistons 32*c* and piston rods 32*a*, are all of the same size and area, and that an even number of cylinders must be utilized. While four cylinders have been illustrated for purposes of illustration, it will be apparent that a greater number of cylinders could be utilized spaced about axial center 38 to obtain an even more sophisticated result. The system utilizes no force or energy of its own and the precharge pressure on the leveling system has no effect on its resistance to tilting of the platens. One leveling cylinder of each pair is acting in the direction of the off-center load and the other leveling cylinder acts in the opposite direction with the same cylinder force, such forces canceling one another.

From the foregoing discussion and accompanying drawings, it will be seen that the invention provides a novel hydraulic leveling system for use in a compression press or like mechanism, wherein a plurality of hydraulic leveling piston and cylinder units are provided, each of the leveling units including a projecting rod member connected to the piston of the respective leveling unit and movable with the piston thereof axially relative to the cylinder of the respective leveling unit, with the leveling units being mounted on one part or platen of the mechanism and having means for selectively coupling the rod members to the other part or platen of the mechanism, and with conduit means coupling opposed of the leveling piston and cylinder units in a closed-loop system, which resists tilting movement of the parts or platens of the mechanism relative to one another. Means are provided for preloading the system with hydraulic fluid after which such means is isolated from the leveling system so that the leveling system operates as a closed-loop system which does not utilize any hydraulic energy or force from the power controls of the equipment, and regardless of the magnitude and location of off-center loads.

The terms and expressions which have been used are used as terms of description and not of limitation, and there is no intention in the use of such terms and expressions of excluding any equivalents of any of the features shown or described, or portions thereof, and it is recognized that various modifications are possible within the scope of the invention claimed.

I claim:

1. In a fluid powered press, a first platen, a second platen, at least one of said platens being reciprocably movable along a predetermined axis relative to the other platen, motor means for so moving said movable platen, a plurality of leveling hydraulic piston and cylinder units, each of said leveling units including a projecting rod member connected to the piston of the respective leveling unit and movable with the piston thereof axially relative to the cylinder of the respective leveling unit, said leveling units being mounted on one of said platens, and means for selectively coupling said rod members to the other of said platens, means coacting with said leveling units in said press for maintaining said leveling unit cylinders filled with hydraulic fluid, conduit means providing hydraulic fluid communication between said leveling units, and means coacting with said maintaining means in and means said press for isolating said maintaining means from said leveling unit cylinders whereby said leveling units and said conduit means are maintained as a closed loop system for preventing tilting movement of said platens relative to one another during said relative axial movement.

2. A press in accordance with claim 1 wherein said platens are of generally rectangular configuration in plan and each of said leveling units is mounted adjacent a respective corner of the mounting platen with each respective rod member being adapted for coupling to the other platen generally adjacent a corresponding corner of the other platen, said conduit means providing for hydraulic fluid communication between diagonally disposed leveling units.

3. A press in accordance with claim 1 wherein each of said leveling units includes a pair of said rod members, each of which projects the same distance from a respective end of the cylinder of the respective leveling unit, and a support means coacting with one of said rod members of each leveling unit for establishing a common reference line for said leveling units.

4. A press in accordance with claim 1 wherein said conduit means couples one side of each piston of one leveling unit to the opposite side of the piston of a diagonally disposed leveling unit.

5. A press in accordance with claim 1 wherein said means for maintaining said leveling units filled with hydraulic fluid includes a pump and a hydraulic fluid reservoir and other conduit means coupling the pressure port of said pump to at least one of said leveling units, and said isolating means comprising valve means in said other conduit means for preventing back flow of hydraulic fluid from said leveling units to said pump.

6. A press in accordance with claim 1 wherein said means for selectively coupling said rod members to the other of said platens comprises an apertured head on each of the rod members, and means mounted on the other platen for receiving said apertured head therein and for locking each said head to said other platen.

7. A press in accordance with claim 1 wherein said coupling means includes reciprocal fluid powered motor units on said other platen each having a wedge coupled thereto and adapted to be received in holding contact with an apertured head of the respective leveling unit rod member, for locking the respective leveling unit to said other platen.

8. A press in accordance with claim 1 wherein said other platen is movable axially relative to the first mentioned movable platen, and including motor means for so moving said other of said platens relative to said first mentioned movable platen.

9. A press in accordance with claim 1 wherein said one movable platen comprises a lower platen in the press, and said other platen comprises an upper platen in the press, said leveling units being mounted on said lower platen, and said means for coupling said leveling units to said other platen including locking means mounted on said other platen.

10. A press in accordance with claim 9 wherein said locking means comprises double acting piston and cylinder motor units mounted generally horizontally on said upper platen with a locking wedge coupled to each of the motor units and being movable generally horizontally relative to the respective platen by the respective motor unit, a female type bracket mounted generally adjacent each corner of the upper platen, each said bracket having an opening in one side thereof adapted for receiving therethrough the wedge member of the respective motor unit, and each said leveling unit having an apertured head adapted to be received in a respective one of said brackets, and said wedge being adapted to be driven forwardly by the respective motor unit to lock the apertured head of the respective leveling unit to the respective bracket, thus locking the leveling units to said upper platen.

11. A press in accordance with claim 1 wherein said means for maintaining said leveling unit cylinders filled with hydraulic fluid includes pilot operated check valve means coacting with the pressure port of a pump of said hydraulic fluid maintaining means for permitting selective opening of the leveling units to pressurized hydraulic fluid from said pump.

12. A press in accordance with claim 3 wherein said support means comprises a plurality of equal stroke fluid powered piston and cylinder motor units mounted in a common plane on said movable platen, each of said piston and cylinder motor units being adapted for engaging coaction with said one rod member of a respective leveling unit to orient the pistons of said leveling units in a common plane parallel to the first mentioned common plane.

13. A press in accordance with claim 12 wherein said piston and cylinder motor units are single acting fluid powered reciprocal motor units, with the piston rods thereof projecting upwardly for abutting engagement with the downwardly projecting rod member of the respective leveling unit.

14. A press in accordance with claim 8 including tie rods on which said platens are movable, and including means for selectively clamping said other platen to said tie rods.

15. A closed-loop hydraulic/mechanical leveling system adapted for installation in a mechanism, such as a fluid powered press having a pair of platens with at least one of the platens being movable along a predetermined axis relative to the other platen, said leveling system comprising a plurality of equal size hydraulic piston and cylinder leveling units, each of which includes a projecting rod member connected to the piston of the respective leveling unit and movable with the piston thereof axially relative to the cylinder of the respective leveling unit, said leveling units being adapted for mounting on one of the platens, and means on said rod members for selectively coupling said leveling units to the other platen, said system including means coacting with said leveling units for maintaining said leveling units filled with hydraulic fluid, conduit means providing hydraulic fluid communication between pairs of said leveling units, and coacting with said maintaining means for isolating said maintaining means from said leveling unit cylinders whereby said leveling units and said conduit means are maintained as a closed loop system, said system being adapted to prevent tilting movement of the platens relative to one another during relative axial movement therebetween.

16. A leveling system in accordance with claim 15, including motor unit means adapted for mounting on the other platen for coaction with said means on said rod members, for coupling said leveling units to the other platen by selectively locking said rod members to the other platen.

17. A leveling system in accordance with claim 16, wherein said means on said rod members comprises transverse openings therein, and said motor unit means including wedge locks adapted for actuation and deactuation by said motor unit means, and upon actuation thereof being adapted to be received in said transverse openings for locking said rod members to the other platen.

* * * * *